United States Patent [19]
Suko et al.

[11] 3,919,601
[45] Nov. 11, 1975

[54] OVERCURRENT PROTECTION CIRCUIT [FOR AN OBJECT CIRCUIT]

[75] Inventors: Shoichi Suko, Tokyo; Kozo Uchida, Fussa; Seiichi Tamada, Tama, all of Japan

[73] Assignee: Iwasaki Tsushinki Kabushiki Kaisha, Japan

[22] Filed: Oct. 25, 1973

[21] Appl. No.: 409,744

[30] Foreign Application Priority Data
Oct. 26, 1972  Japan............................ 47-106683
Aug. 9, 1973  Japan.............................. 48-88795

[52] U.S. Cl........................ 317/31; 317/33 R; 323/9
[51] Int. Cl.² .......................................... H02H 3/20
[58] Field of Search............. 307/202; 317/31, 33 R, 317/33 UR; 323/9

[56] References Cited
UNITED STATES PATENTS
3,409,803  11/1968  Dewitt............................. 317/33 R
3,449,598  6/1969  Wright.............................. 317/31 X
3,571,608  3/1971  Hurd................................. 317/31 X
3,633,093  1/1972  Templeton et al..................... 323/9
3,641,423  2/1972  Stauffer............................. 323/9
3,760,228  9/1973  Uchida........................... 317/33 R

*Primary Examiner*—A. D. Pellinen
*Attorney, Agent, or Firm*—Robert E. Burns; Emmauel J. Lobato; Bruce L. Adams

[57] ABSTRACT

An overcurrent protection circuit provided between a power source and a load for protecting the power source from an overcurrent which may be caused in the power source by an abnormally high voltage erroneously applied to the load of the power source. A current limiter including at least one transistor is combined, in the protection circuit, with a diode circuit for effectively cutting off the overcurrent by controlling the transistor base current in response to the overcurrent.

6 Claims, 5 Drawing Figures

OVERCURRENT PROTECTION CIRCUIT [FOR AN OBJECT CIRCUIT]

This invention relates to an overcurrent protection circuit for an object circuit and, more particularly, to a circuit for protecting a power source, a standard resistor and other circuit elements from an overcurrent in a resistance voltage converter.

There have been heretofore proposed in the art overcurrent protection circuits of the type. However, the conventional protection circuits have such disadvantages as necessity of a transistor having a high dc amplification factor, necessity of many kinds of source voltages, neccesity of a high source voltage, and necessity of high allowable power consumption.

An object of this invention is to provide an overcurrent protection circuit using resistors of small allowable power consumption capable of effectively cutting off any overcurrent in the elements of a power source without affection of the normal operation of the power source.

The principle, construction and operations of this invention will be clearly understood from the following detailed discussion taken in conjunction with the accompanying drawings, in which.

Figure 2:
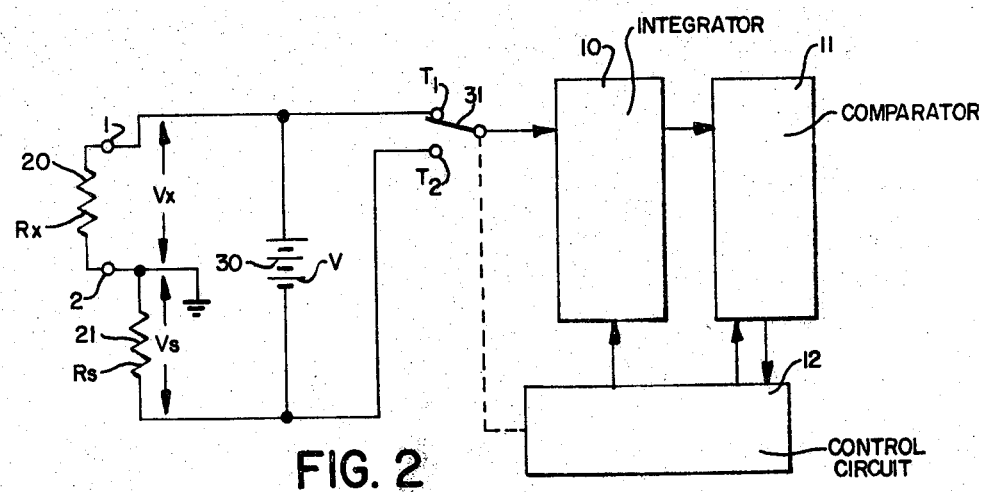
FIG. 2 is a diagram illustrating a resistance-voltage converter to which this invention is applied.

With reference to FIG. 2, the principle of the aforesaid resistance-voltage converter, to which this invention is applied, will first be described. A resistor 20 having a resistance $R_X$ to be measured is connected in series with a resistor 21 having a standard resistance $R_s$, and a voltage V floating about ground is applied from a dc source 30 to both terminals 1 and 3 of the series connection of the resistor 20 and 21. At this time, voltages $V_X$ and $V_S$ across terminams 1 and 2 and across terminals 2 and 3 can be indicated as follows:

$$V_x = \frac{R_x}{R_x + R_s} V \qquad V_s = \frac{-R_s}{R_x + R_s} V$$

so that the ratio of the resistance $R_X$ to the resistance $R_S$ is converted to the ratio of the voltage $V_X$ to the voltage $V_S$. After the voltage $V_X$ is integrated for a certain period of time $t_1$, the voltage $V_S$ is integrated until the integrated value reaches the initial level. If the time for the second integration is taken as $t_1$, it follows that $$R_x = \frac{t_2}{t_1} R_s.$$

so that the value of the unknown resistance $R_X$ can be obtained by measuring the time $t_2$ for the integration of the voltage $V_S$. If a high voltage is erroneously impressed across the terminals 1 and 2 of the resistor 20 of such a resistance-voltage converter, there is a dangerous possibility that a high voltage destroys elements of the standard resistor 21, the power source 30, a switch 31, an integrator 10, a comparator 11 and a control circuit 12 by the resulting overcurrent flowing therein.

This invention is intended to protect the elements from the overcurrent which results from the impression of the overvoltage.

Figure 1:
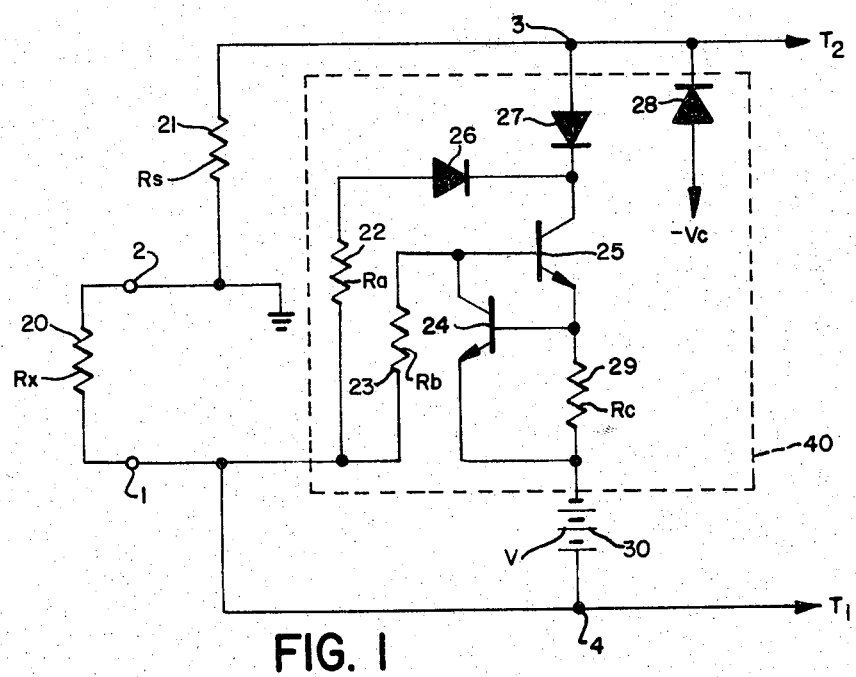
FIG. 1 is a circuit diagram illustrating an embodiment of this invention.

FIG. 1 illustrates one example of this invention, in which a reference numeral 2 indicates a common ground terminal of the resistor 20 to be measured and the standard resistor 21, 1 an input terminal of the resistor 20 to be measured, and a reference 30 a power source of a voltage V. The broken-line block 40 represents a protection circuit in accordance with this invention, in which a reference 25 identifies a transistor of high breakdown voltage, which limits a current flowing in the standard resistor 21 and the power source 30. A reference 24 indicates a control transistor which effects negative feedback to the transistor 25 in a manner to control its base current in response to the collector current of the transistor 25; 29 identifies a resistor of a value Rc employed for detecting the collector current of the transistor 25; 23 shows a base resistor of the transistor 25 having a value Rb; 22 designates a resistor whose resistance value Ra is sufficiently small so that a current flowing therein may not greatly change with the values of the resistors 20 and 21; and 27 represents a diode which is adapted such that when a voltage positive with respect to the grounding point 2 is applied to the terminal 1, it becomes reversely biased to control the base-collector current of the transistor 25 and, at the same time, reduces a voltage applied across the resistor 22. A reference 26 identifies a diode which is reversely biased to reduce the voltage across the resistor 22 upon application of a negative voltage to the terminal 1; and 28 indicates a diode for clamping the voltage at the terminal 3 with a negative voltage.

During a normal operation, the unknown resistor 20 is connected between the terminals 1 and 2. In this case, if the DC current amplification factors and the base emitter voltages of the transistors 24 and 25 are taken as values $h_{FE1}$, $h_{FE2}$ and $V_{BE1}$, $V_{BE2}$ respectively, the collector current $I_{c1}$ of the transistor 25 is given as follows:

$$I_{c1} = \frac{\frac{V - (V_{BE1} + V_{BE2})}{R_b \, h_{FE2}} + \frac{V_{BE2}}{R_c}}{1 + \frac{\frac{1}{h_{FE2}} + 1}{h_{FE1}}}$$

If the value $h_{FE2}$ is sufficiently larger than one, $$I_{c1} \approx \frac{\frac{V - (V_{BE1} + V_{BE2})}{R_b \, h_{FE2}} + \frac{V_{BE2}}{R_c}}{1 + \frac{1}{h_{FE1}}} \qquad (1)$$

and this collector current $I_{c1}$ becomes substantially a constant current, which is dependent upon the values of the base resistor 23 of the transistor 24 and a resistor 29 and the DC current amplification factors $h_{FE}$ and the base-emitter voltages $V_{BE}$. Consequently, by selecting the value Ra of the resistor 22 to be sufficiently small, the voltage across the terminals 2 and 3 becomes constant regardless of the value $R_X$ of the unknown resistor 20.

In a case where an overvoltage is applied across the terminals 1 and 2, if the overvoltage is positive at the terminal 2, an increase in the emitter current of the transistor 25 causes an increase in the base current of the transistor 24, so that the collector current of the transistor 24 increases. Since the current flowing in the resistor 23 is a constant value $(V - (V_{BE1} + V_{BE2}))/Rb$ the base current of the transistor 25 decreases to cause a decrease in the collector current of the transistor 25. Namely, the transistor 24 effects the negative feedback to the transistor 25, so that the collector current of the transistor 25 is limited to a certain value, and so that the overvoltage is applied across the collector and emitter of the transistor 25 and is not applied to the power source 30. Further, it is also considered that the voltage at the terminal 3 may become negative with respect to the ground. However, the voltage at the terminal 3 is clamped by the diode 28 at a voltage $-V_c$, so that no over voltage is applied to the resistor 21. Moreover, at this time, the diode 26 is cut off so that the voltage applied to the resistor 22 thereby decreases to a sufficiently low value. Consequently, the resistor 22 may be of sufficiently small value and of small power consumption type.

Next, a description will be made in connection with a case where an overvoltage negative with respect to the terminal 2 is applied to the terminal 3. In this case, the diode 27 is cut off and the overvoltage impressed to the input terminal 3 is largely loaded to the diode 27 and the resistor 21 is substantially isolated from the circuit 40, so that the current caused in response to the overvoltage hardly flows in the circuit 40 and the circuit source 30 is protected.

Figure 3:
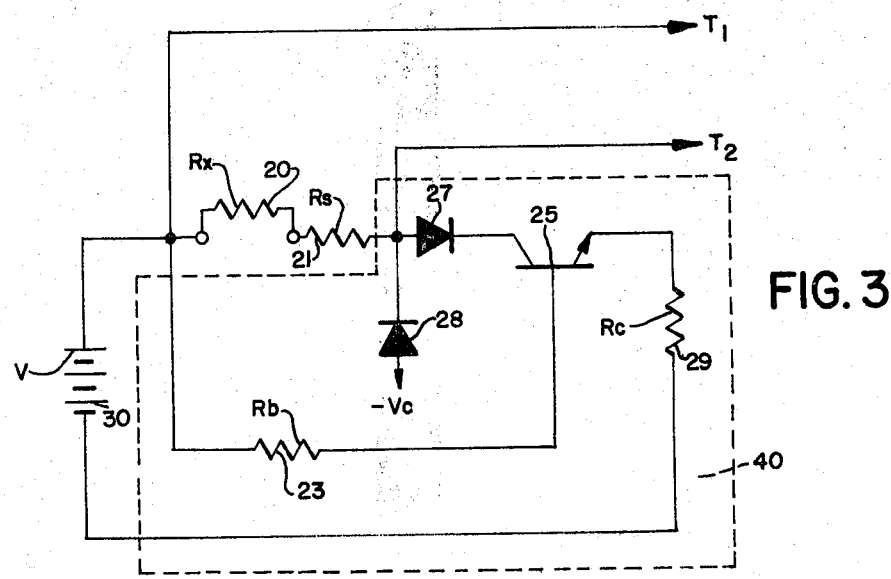
FIG. 3 is a circuit diagram illustrating a modification of the example shown in FIG. 1.

In a case where a range of measurement of the resistance of the resistor 20 is narrow, the resistor 22 and the diode 26 may be omitted. If the DC current ampification factor $h_{FE}$ of the transistor 25 is large, the transistor 24 may also be omitted. In this case, the circuit 40 becomes as shown in FIG. 3.

As has been described in the foregoing, the present invention has such an advantage that a diode is combined with a constant-current, current-limiter circuit composed of a transistor, whereby, upon application of an overvoltage, a current flowing in each circuit element is limited within a safe value without exerting any influence on the normal operation, thus protecting a resistance-voltage converter or the like from an overvoltage of about 1000 volts without using elements of large capacity.

In the above example of this invention, the breakdown voltage between the collector and emitter of the high breakdown voltage transistor is defined by an impedance inserted between its base and emitter. If the value of the impedance inserted is not sufficiently small, the breakdown voltage between the emitter and the collector is usually about half that between the collector and the base. Further, even if the breakdown voltage between the emitter and the collector can be raised to a certain degree, there is the possibility of breakdown with an impressed voltage above a certain value unless the collector current is made sufficiently small.

Figure 4:
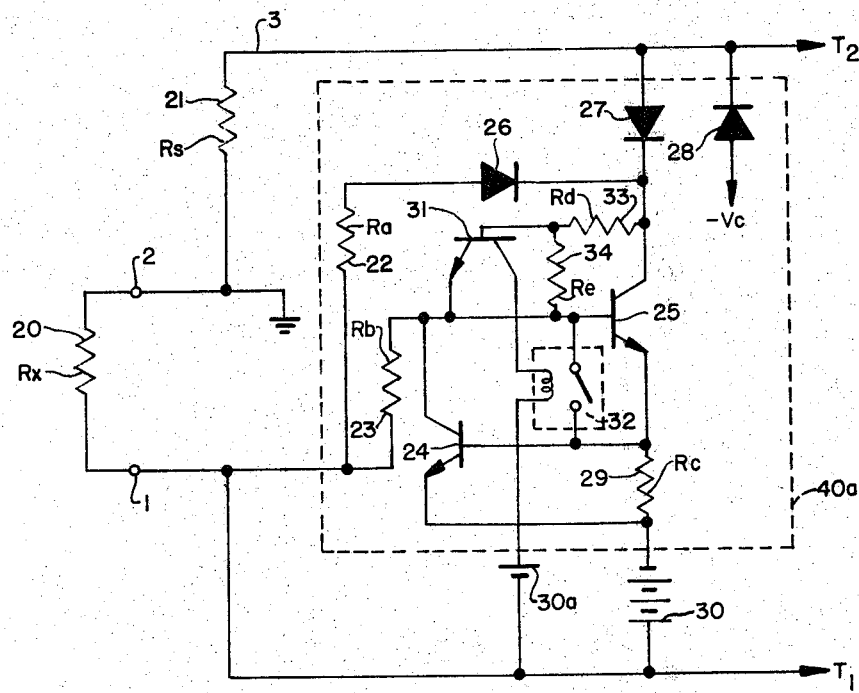
FIG. 4 is a diagram illustrating another embodiment of this invention.

FIG. 4 illustrates one example of this invention capable of eliminating the above defects, in which a reference numeral 2 indicates a common ground terminal of the resistor 20 to be measured and the standard resistor 21, 1 an input terminal of the resistor 20 to be measured, and reference characters 30 and 30a power sources. The broken-line block 40a represents a protection circuit provided in accordance with this invention, in which a reference 25 identifies a transistor capable of withstanding high voltage, which limits and cuts off a current flowing in the standard resistor 21 and the power source 30. A reference 24 indicates a control transistor which effects the negative feedback to the transistor 25 to control its base current in response to the collector current of the transistor 25. A reference 31 designates a transistor which detects a voltage between the collector and the base of the transistor 25 to drive a relay or a switching element 32 corresponding thereto, 29 refers to a resistor for detecting the collector current of the transistor 25; 23 shows a base resistor of the transistor 25; 22 identifies a resistor whose resistance value $Ra$ is sufficiently small so that a current flowing therein may not greatly change with the resistance values of the resistors 20 and 21; and 33 and 34 represent detection resistors established at an appropriate dividing ratio for detecting the voltage across the base and the collector of the transistor 25. It is assumed that the resultant value $(R_d + R_e)$ of a series-connection of the resistors 33 and 34 is sufficiently larger than the value $R_b$ of the resistor 23. A reference 27 indicates a diode which is reversely biased to limit the base-collector current of the transistor 25 and, at the same time, to reduce a voltage applied across the resistance 22 when a voltage positive with respect to the grounding point 2 has been applied to the terminal 1. A reference 26 identifies a diode which is reversely biased to reduce the voltage across the resistor 22 upon application of a negative voltage to the terminal 1; 28 denotes a diode for clamping the voltage of the terminal 3 to a negative voltage; and 32 shows a relay or a switch corresponding thereto which conducts to raise the breakdown voltage across the collector and emitter of the transistor 25 when the voltage across the base and the collector of the transistor 25 exceeds the voltage established by the resistors 33 and 34.

During a normal operation, the unknown resistor 20 is connected across the terminals 1 and 2. In this case, if the DC current emplification factors and the base-emitter voltages of the transistor 25 and 24 are taken as $h_{FE1}$, $h_{FE2}$ and $V_{BE1}$, $V_{BE2}$ respectively, the collector current $I_{c1}$ of the transistor 25 is given as the equation (1) under a condition: $Rd + Re >> Rb$ so that this collector current $I_{c1}$ becomes a constant current which is dependent upon the resistance $Rb$ and $Rc$ of the resistors 23 and 29, the DC current amplification factors $h_{FE}$ and the base-emitter voltages $V_{BE}$. Consequently, if the resistance $Ra$ of the resistor 22 is established so as to be sufficiently small, the voltage across the terminals 2 and 3 becomes substantially constant regardless of the value of the resistance $Rx$ of the resistor 20.

The operations of this example are substantially the same as the example shown in FIG. 1 except as the following operations.

A difference between the voltages across the collector and the emitter of the transistor 25 and across its collector and base is about 0.6 volts and an increase in the overvoltage under such condition causes an increase in the voltage between the collector and the base of the transistor 25. If the voltage across the collector and the emitter of the transistor 25 is taken as a value $V_{cE1}$, the voltage $V_{BE3}$ across the base and the emitter of the transistor 31 is given by a value $Re \cdot V_{cE1}/(Rd + Re)$. When the voltage $V_{cE1}$ has reached such a value that the latter voltage becomes about 0.6 volts, the transistor 31 conducts to drive the relay 32 to short-circuit the base and the emitter of the transistor 25, whereby the breakdown voltage across the collector and the emitter of the transistor 25 is raised and the transistor 25 is completely cut off, so that no collector current flows therein, thus providing for enhanced reliability in the operation at high voltages.

Figure 5:
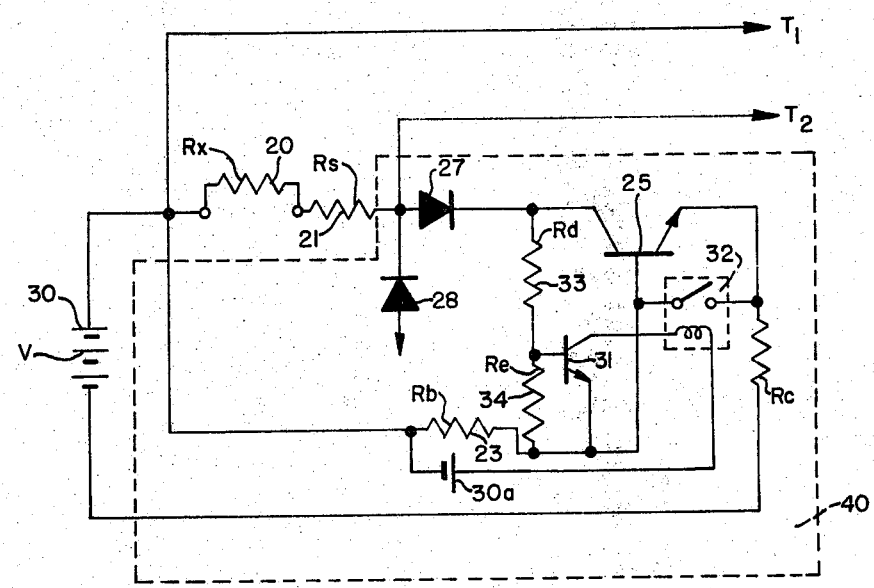
FIG. 5 is a diagram illustrating a modification of the example shown in FIG. 4.

In a case where a range of measurement of the resistance of the resistor 20 is narrow, the resistance $R_a$ of the resistor 22 and the diode 26 may be omitted. If the DC current amplification factor $h_{FE}$ of the transistor 25 is large, the transistor 24 may also be omitted. In this case, the circuit becomes as shown in FIG. 5.

As has been described in the foregoing, the later example of the present invention has such an advantage that a diode, a transistor and a relay or a switching element corresponding thereto are combined with a constant-current, current limiter circuit composed of a transistor, whereby, upon application of an overvoltage, a current flowing in each circuit element is limited and cut off without exerting any influence in the normal operation, thus protecting a resistance-voltage converter of the like from an overvoltage above ±1000 volts without using element of large power capacity. Further, the breakdown voltage across the collector and the emitter of the transistor of the high breakdown voltage transistor circuit may be low and it is sufficient that only the breakdown voltage between its collector and the base is high, so that the circuit construction is small and inexpensive.

What we claim is:

1. An overcurrent protection circuit connected in series between a power source terminal and a load terminal, comprising:
   a high-breakdown voltage transistor having a collector-emitter conductive path connected in series between the power source and the load,
   a high voltage breakdown diode connected in series between the load and the collector of said transistor to prevent application of a high reverse voltage to said high-breakdown voltage transistor,
   detection means comprising a detection resistor connected in series to the collector-emitter conductive path of said high-breakdown voltage transistor to detect a current flowing through said high-breakdown voltage transistor and
   control means comprising a control resistor having one terminal connected to the base of said transistor and having another terminal connected to a junction of the source and the load operatively coupled to said detection means for reducing the collector current of the transistor in response to the increase of said current detected by said detection means.

2. An overcurrent protection circuit according to claim 1, in which said detection means further includes a control transistor biased by a voltage developed across said detecting resistor for controlling the base current of said high-breakdown voltage transistor.

3. An overcurrent protection circuit according to claim 1, further including a diode connected in parallel with the series circuit comprising the collector-base path of said high-breakdown voltage transistor and said control resistor to assume a conductive condition when a positive overcurrent is applied to the load.

4. An overcurrent protection circuit comprising:
   a. a bipolar transistor having a pair of principal conduction electrodes having relative polarities and a control electrode, said control electrode receptive in operation of external electrical signals for controlling the conductivity characteristics of said transistor between said pair of principal conduction electrodes;
   b. a first diode electrically connected to one of said principal conduction electrodes and having a polarity effective to prevent high reverse voltages from being developed across said pair of principal conduction electrodes by current flowing through said first diode;
   c. a detection resistor connected in series in the circuit path defined between said pair of principal conduction electrodes and through said first diode for developing a voltage thereacross in response to current flowing through said circuit path;
   d. control means responsive to the voltage developed across said detection resistor for controlling external electrical signals applied to said control electrode to reduce current flowing through said transistor in response to an increase of the current flowing through said circuit path;
   e. a first resistor connected to said control electrode;
   f. a second resistor and a second diode connected in series; and
   g. means electrically connecting said first resistor, said second resistor and said second diode in series between said control electrode and said one of said principal conduction electrodes, said second diode having a polarity effective to prevent current from flowing from said one of said principal conduction electrodes to said control electrode when said first diode is conductive.

5. An overcurrent protection circuit according to claim 4, further comprising:
   a. detecting means for detecting a voltage developed in use between a first of said pair of principal conduction electrodes and said control electrode; and
   b. means cooperative with said detecting means for short-circuiting said control electrode and the second of said pair of principal conduction electrodes when the voltage detected by said detecting means exceeds a pre-determined value.

6. An overcurrent protection circuit connected between a power source and a load, comprising:
   a high-breakdown voltage transistor having a collector-emitter conductive path connected in series between the power source and the load,
   a high voltage breakdown diode connected in series between the load and the collector of said transistor to prevent application of a high reverse voltage to said high-breakdown voltage transistor.
   detection means comprising a detection resistor connected in series to the collector-emitter conductive path of said high-breakdown voltage transistor to detect a current flowing through said high-breakdown voltage transistor,
   control means comprising a control resistor connected to the base of said transistor and operatively coupled to said detection means for reducing the collector current of the transistor in response to the increase of said current detected by said detection means.
   second detection means connected to said transistor to detect a voltage across the collector-base path thereof, and
   a switching circuit comprising a switching element and a driving circuit of the switching element, said switching element connected to said transistor to form a short circuit across the base-emitter path thereof when an overcurrent detected by said second detection means is applied to said transistor.

* * * * *